Figure 1:
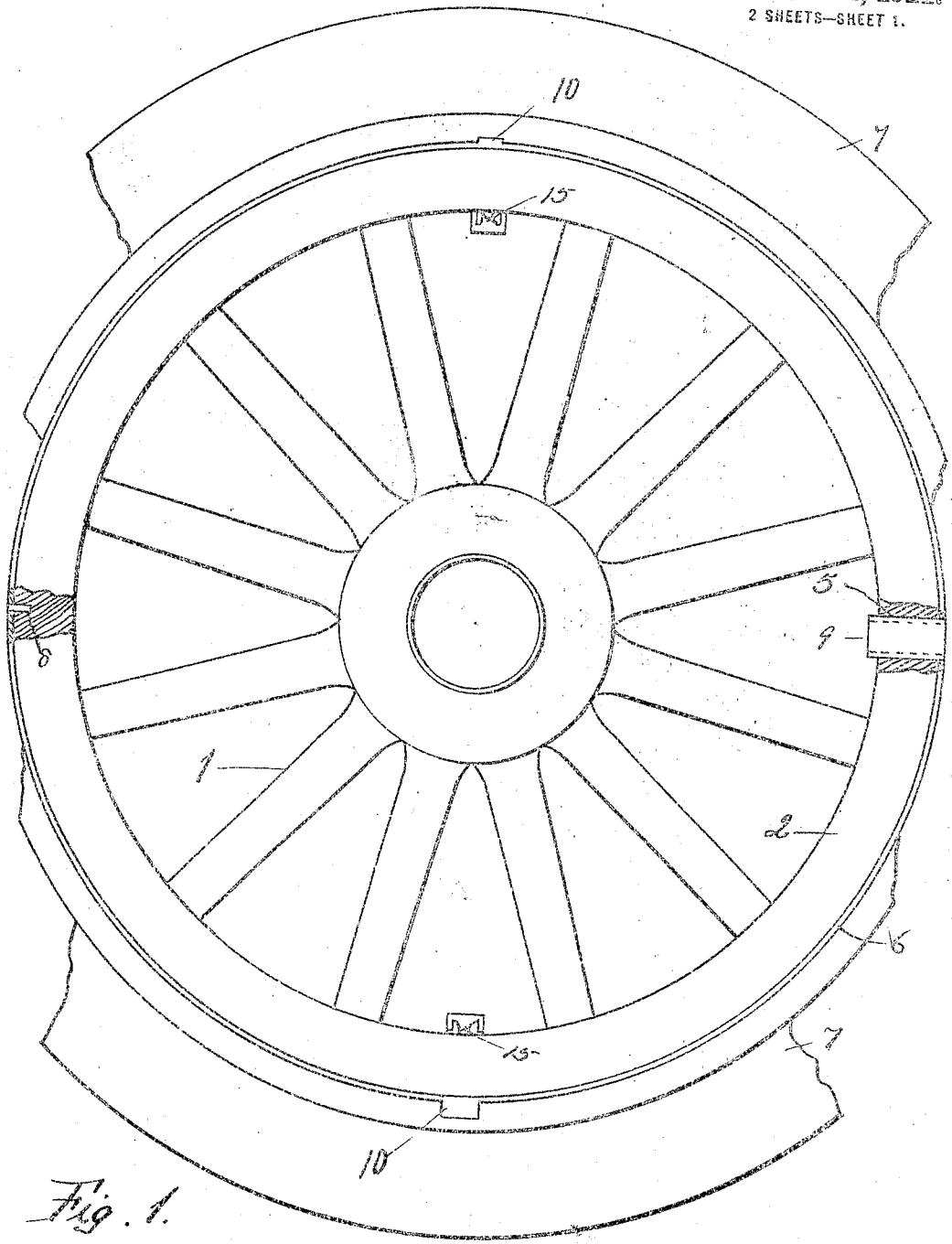

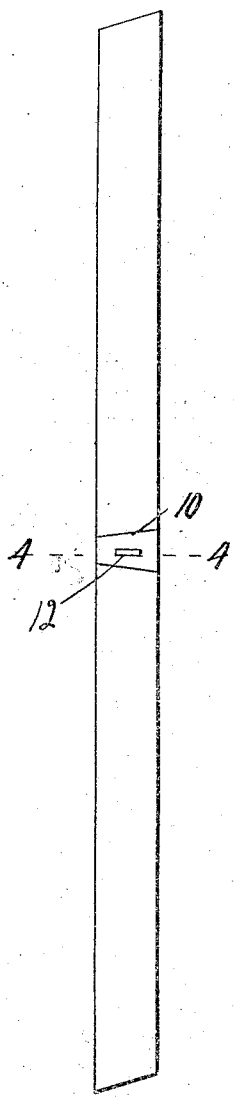
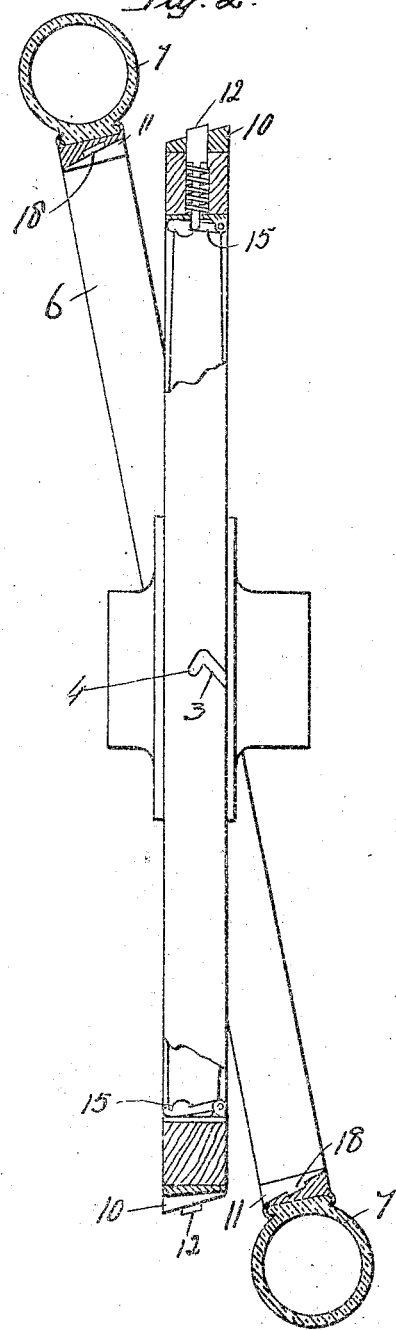
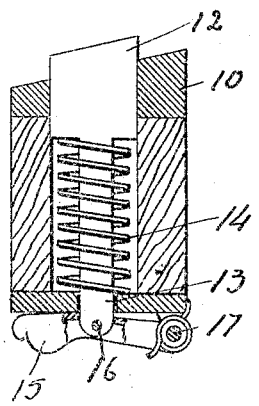

UNITED STATES PATENT OFFICE.

ERNEST BUNZEL, OF PLYMOUTH MEETING, PENNSYLVANIA.

QUICK-ACTING DEMOUNTABLE RIM.

1,397,573.  Specification of Letters Patent.  Patented Nov. 22, 1921.

Application filed November 3, 1919. Serial No. 335,337.

*To all whom it may concern:*

Be it known that I, ERNEST BUNZEL, a citizen of the United States, residing at Plymouth Meeting, in the county of Montgomery and State of Pennsylvania, have invented a new and useful Improvement in Quick-Acting Demountable Rims, of which the following is a specification.

My invention relates to a new and useful improvement in quick attaching demountable rims for automobile wheels, and has for its object to so construct a rim of this description and a wheel therefor that the rim may be readily mounted or demounted without the use of bolts or nuts; a further object of my invention is to provide for automatically locking the rim in position when mounted on the wheel, and a still further object of my invention is to provide for the passage of the air valve of a tire through both the felly of the wheel and the demountable rim without injury to the said valve.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawings forming a part of this application, in which—

Figure 1. is a side view of a wheel and rim made in accordance with my invention, a portion of the rim being broken away, and also portions of the wheel sectioned away to show the position of the pivots.

Fig. 2. is an edge view of the wheel partly broken away, the demountable rim being shown pivoted to the wheel and ready to be swung in to locked position, said rim being in section.

Fig. 3. is an edge view of the wheel before the rim is mounted thereon showing one of the locking wedges.

Fig. 4. is an enlarged section of one side of the wheel at the line 4—4 of Fig. 3.

In carrying out my invention as here embodied 1 represents the wheel and 2 the felly or permanent rim thereof. This permanent rim has an angular slot 3 formed therein, the inner end 4 of which slot serves as a fulcrum seat as hereafter explained; diametrically opposite the fulcrum seat 4 is a hole 5 formed through the permanent rim or felly also for the purpose of a fulcrum seat.

6 represents the demountable rim which is adapted to receive and have secured thereto a tire 7 and this rim has a pivot pin or stud 8 secured therein and projecting radially inward, said pin being adapted to enter the angular slot 3 and rest in the fulcrum seat 4.

In the opposite side of the rim 6 is secured a hollow stud 9 which also serves as a pivot pin and is adapted to pass through the hole 5 in the permanent rim of the wheel.

By this arrangement to mount the rim 6 on the wheel it is only necessary to first insert the hollow stud 9 in the hole 5 and then pass the pin 7 into the angular slot 3 until said pin rests in the fulcrum seat 4, while the rim is held at an angle to the wheel as shown in Fig. 2, after which the rim 6 is swung on the pin 7 and stud 9 as pivots until it comes into proper position on the permanent rim of the wheel; it being understood that the outer surface of the permanent rim and the inner surface of the demountable rim are so beveled as to match together and contact when brought into this relation.

In order that the demountable rim may be held against slipping on the permanent rim without depending upon the pivots two wedge shaped keys 10 are located diametrically opposite each other on the outer surface of this rim and are adapted to enter the corresponding slots 11 formed in the demountable rim, thus locking the demountable rim against rotary movement relative to the permanent rim, and relieving the pivots of this strain. 12 represents two locking bolts each of which passes through a suitable slot in the permanent rim and one of the wedges 10, and this bolt is provided with a shank 13 around which a spring 14 is coiled in such a manner as to normally force the bolt outward. The retraction of this bolt is provided for by the lever 15 being pivoted thereto at 16 said lever being in turn pivoted at 17.

When the demountable rim is swung into alinement with the permanent rim the lock 15 will snap into the keeper recess 18 and thus securely hold the demountable rim in place.

To demount the demountable rim it is only necessary to retract the locking bolts 12 by actuating the levers 15 against the springs 14, when the rim will be free to be swung upon the pivots to the position shown in Fig. 2, after which the pin 7 is disengaged from the slot 3 and the hollow stud withdrawn from the hole 5.

The hollow stud 9 serves to permit the air valve casing of a pneumatic tire to pass through the rims.

By the use of my invention a rim carrying a tire may be quickly removed and another substituted therefor without the use of any tools and when in place will be securely held.

Of course I do not wish to be limited to the exact details of construction as herein shown as these may be varied within the limits of the appended claim without departing from the spirit of my invention.

Having thus fully described my invention, what I claim as new and useful is:—

In combination, a permanent wheel rim having a beveled outer surface inclined in opposite directions at two diametrically opposite points and decreasing inclination to two other diametrically opposite points midway between the two first mentioned points, wedge shaped keys on said rim and projecting from the beveled surface thereof at the points of greatest inclination, the outer surface of said keys being inclined in the same direction as the beveled surface of the rim, a demountable rim having its inner surface beveled to coincide with the beveled surface of the permanent rim and provided with transverse recesses for registration with the wedge shaped keys, means for detachably pivoting the demountable rim at the points of least inclination, beveled surfaces and spring actuated locking means passing through the permanent rim, the keys thereon adapted to engage the demountable rim for holding the same in proper position relative to the permanent rim.

In testimony whereof, I have hereunto affixed my signature.

ERNEST BUNZEL.